United States Patent [19]
Stursberg

[11] 3,974,726
[45] Aug. 17, 1976

[54] CUTTER FOR BAR STOCK
[75] Inventor: Bernd Stursberg, Ennepetal, Germany
[73] Assignee: Rolf Peddinghaus
[22] Filed: Oct. 21, 1975
[21] Appl. No.: 624,437

[30] Foreign Application Priority Data
Oct. 29, 1974 Germany............................ 2451290

[52] U.S. Cl. ................................................. 83/157
[51] Int. Cl.² ............................................ B26D 7/16
[58] Field of Search ...................................... 83/157

[56] References Cited
UNITED STATES PATENTS
3,631,750  1/1972  Hanni .................................. 83/157
FOREIGN PATENTS OR APPLICATIONS
303,046   1/1918   Germany .............................. 83/157
1,652,760  11/1970  Germany .............................. 83/157

Primary Examiner—Willie G. Abercrombie
Attorney, Agent, or Firm—Hill, Gross, Simpson, Van Santen, Steadman, Chiara & Simpson

[57] ABSTRACT

A cutter mechanism for cutting the ends off bar stock or the like wherein the bar stock is moved incrementally into a cutting station with reciprocating cutters for cutting a piece off the end with said piece in the cutting station, a vertical support below the piece in the cutting station movable laterally between a support position beneath the cutting station and a release position laterally away from the station, a stop member against which the piece engages in the cutting station with the stop member movable laterally between a stop position engaging the piece means including a pivotal arm wherein the point of connection between the vertical support and the arm is adjustable so as to be able to independently control the lateral movement of the support relative to the stop member while the support and the stop member move simultaneously with the arm.

13 Claims, 1 Drawing Figure

U.S. Patent   Aug. 17, 1976   3,974,726
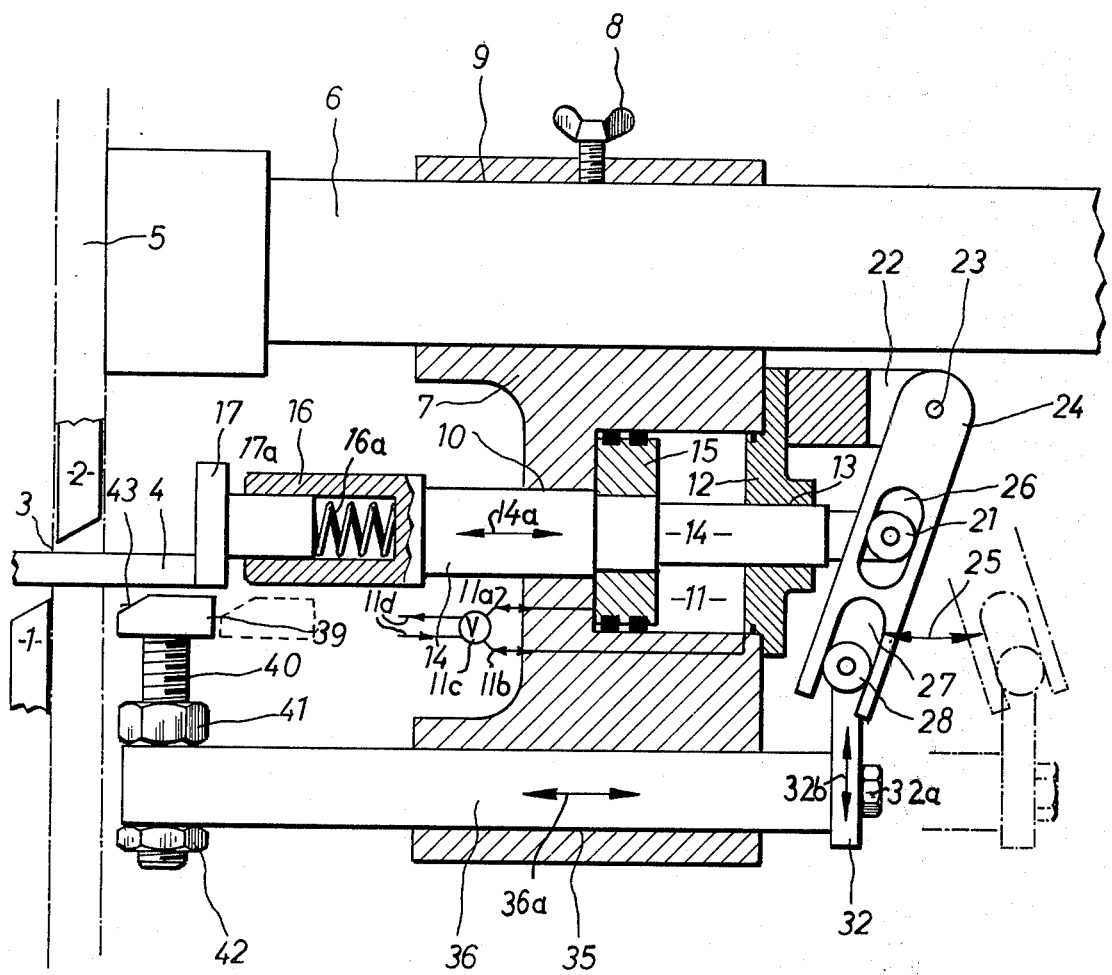

CUTTER FOR BAR STOCK

BACKGROUND OF THE INVENTION

The invention relates to a cutter particularly of the type used for cutting ends from bar stock wherein the bar stock is moved incrementally into a cutting station. A stop member is engaged by the end of the bar stock as it is moved into the cutting station, and a vertical support is located beneath the piece to be cut off in the cutting station. Both the vertical support and stop member are moved away from the cutting station to a release position after the piece has been cut off the end of the bar stock.

With the cutting of ends off of bar stock, there is a necessity for providing a stop member which the bar stock engages as it moves into the cutting station. There is also a need for a vertical support for aiding in accurately positioning the bar stock relative to the cutters just before and during the cutting operation. As soon as the piece is cut from the bar stock, it has to be released to drop downwardly. This requires that the vertical support and the stop member be moved out of the way. Because of their positions relative to the piece which is cut, the stop member need only move a short distance to release the piece, while the vertical support, which has been beneath the piece, must be moved laterally a substantial distance to be clear of the piece and permit it to drop downwardly.

In addition to this problem of the difference in amount of movement, a mechanism of this type is normally designed to be able to cut end pieces of different sizes. With cut pieces of different lengths, it is necessary that the vertical support move a greater or less distance depending upon the size of the piece cut. In other words, the vertical support must move at least the distance equal to the length of the piece being cut to be moved completely out of the way. Yet, even with changes in sizes of the pieces being cut, the end stop need only be moved the same distance because it only has to be moved sufficient to release the cut piece.

Another requirement for a mechanism of this type is that the vertical support and the stop member be moved simultaneously and as rapidly as possible for rapid production operation. Yet, they must move back and forth accurately so that they perform their functions in each position.

It is accordingly an object of the present invention to provide a cutter mechanism of the type described wherein a stop member and a vertical support are provided, and these parts are driven by an improved common drive mechanism which provides for rapid and effective movement for rapid release of ends cut from bar stock.

A further object of the invention is to provide a cutting mechanism of the type described wherein the vertical support and the stop member are moved rapidly for no more than the required distance, but are moved adequately to release the piece, and their amount of travel is independently adjustable despite their common drive source so that the vertical support will move rapidly and adequately regardless of the size of the piece cut so as not to slow down the cutting operation.

A still further object of the invention is to provide an improved drive for a cut of the type described wherein the length of the path of travel of the vertical support is adjustable by an improved means.

In accordance with the principles of the invention, the vertical support and the stop member are moved in parallel paths. The stop member serves as a stripper for the piece which has been cut from the bar stock and which is lying on the vertical support member, as the support member is moved out of the way. The cut pieces of all sizes are rapidly removed from the vertical support member and will drop freely downwardly from the space where they have been cut which is referred to herein as the cutting station.

In accordance with the invention, a common drive mechanism is used in the form of a pivotal arm, and the stop member and vertical support are mounted on parallel sliding shafts. The drive connection between the lower shaft which carries the support member is such that it is easily and readily adjusted so as to change the fulcrum arm of the pivotal arm relative to its driving of the support member. The height of the vertical support member may also be adjustably varied to improve the accuracy and effectiveness of the parts.

A further advantage of the arrangement constructed and operating in accordance with the present invention is that a frame is provided which supports the stop member and support member and is adjustably connected to the cutting mechanism so that their relative lateral positions may be varied. The arrangement is sufficiently flexible so that the positions, the amount of travel, and operation of the vertical support and stop member may be quickly varied, and the mechanism can be operated and used without the vertical support member.

Other objects, advantages and features, as well as equivalent structures which are intended to be covered hereby, will become more apparent with the teaching of the principles of the invention in connection with the disclosure of the preferred embodiment in the specification, claims and drawings in which:

DRAWINGS

The single FIGURE of the drawing is a vertical section of a cutting mechanism constructed and operating in accordance with the invention, with portions shown somewhat schematically for clarity.

DESCRIPTION

The cutting mechanism is provided with a stationary lower knife 1 and a vertically reciprocating upper knife 2. Suitable drive mechanism, not shown, is provided for powerfully vertically moving the upper knife 2 through an up and down cutting cycle.

The bar stock 4 is incrementally slid into position with the cutting edge of the cutter 2 engaging the bar stock at 3. The righthand end of the bar stock which will be severed is then located in the cutting station.

The driving and operating frame for the cutter is shown at 5 and is mounted on a horizontal carrier beam 6. This beam is suspended for lateral adjustment in the frame 7. The frame has a lateral opening 9 therethrough so as to permit sliding adjustment of the beam 6, and it is held in place by the tightening of set screws, such as 8, to hold it in its relative lateral adjusted position.

Also supported in the frame is the stop 17 against which the bar stock 4 is advanced, and a vertical support 39 which vertically supports the bar stock in the work station.

The stop member 17 is supported on a first laterally reciprocating shaft 14. The shaft passes through an opening or sliding bearings 10 and 13 in the frame to accommodate lateral sliding movement as indicated by the arrowed line 14a. The shaft 14 is so arranged so as to carry a piston 15 thereon which is slidably mounted in a cylinder 11. The piston provides the drive mechanism for moving the stop 17 and the vertical support 39 between a first support position, and a second release position. The stop 17 and the support 39 are shown in the support position in the drawing, and will be moved to the right away from the piece 4 in the release position.

For driving the piston 5 and thereby moving the rod or shaft 14, fluid pressure lines 11a and 11b connect to the cylinder 11 at each end of the piston. Fluid pressure to these lines from supply lines 11d is controlled by a control valve 11c which will be operated in a manner which will be recognized by those versed in the art.

The piston rod 14 has a head 16 on its end with an axial opening so as to accommodate the base 17a of the stop member which is slidably located therein and is acted on by a spring 16a which holds the stop member 17 firmly against the piece 4 when the piston 14 is in the support position as shown in the drawing.

The operating position, that is, the stop position of the stop member 17 can be adjusted by sliding the frame 7 along on the beam 6 by first loosening the thumb screws 8.

The reciprocal movement of the piston rod 14, in moving the stop member 17 from the stop position to the release position, is transmitted to the support 39 by a rocker arm 24. The rocker arm is pivotally supported at its upper end at a pivot point 23 on a bracket 22 mounted on the frame 7. The bracket is secured to a cap 12 which closes the cylinder 11 which is located within the frame or housing 7.

Reciprocal movement of the piston 14 will swing the arm 24 along the path of the arrowed line 25. The arm has a longitudinally extending slot 26 into which extends a roller 21 carried on the end of piston rod 14.

At the lower end of the arm 24, it is bifurcated to provide a slot 27. In the slot 27 is a follower roller 28 carried on a plate 32 secured to the end of a second shaft or rod 36 which is slidably mounted in a bore 35 of the frame 7. The rod 36 reciprocates as is indicated by the arrowed line 36a. The follower roller 28 is carried on a plate 32 which is bolted by means of a cap bolt 32a to the end of the rod 36. The plate 32 has an elongate slot, not shown, which permits adjustably shifting the plate 32 up and down along the path of the arrowed line 32b. Shifting the plate 32 will change the location of the roller 28 in the slot 27 and thereby change the effective operating length of the arm 24. That is, it will change the position of the follower roller 28 relative to the roller 21 and thereby change the amount of movement given to the shaft 36 relative to the piston rod 14. This permits changing the length of the path of travel of the support 39 relative to the length of path of travel of the stop 17.

The pivotal arm 24 shown in its solid line position with the stop 17 and the support 39 in their support position, and the dotted line position of the arm 24 indicates the position of the parts when the stop 17 and support member 39 are moved to their release positions.

The vertical support 39 is carried on the other end of the shaft 36 by a vertical rod 40. The rod 40 passes through a hole in the shaft, and upper and lower nuts 41 and 42 lock the rod 40 in its vertically adjusted position relative to the shaft 36. By adjusting the nuts 41 and 42, the vertical support position of the plate 39 can be changed.

The plate 39 has a lead-in incline 43 which enables the workpiece 4 to be more easily slid into the cutting station.

With respect to the arm 24, because the distance from the pivot point 23 to the roller 21 is less than the distance from the pivot point 23 to the roller 28, the support plate will have a much greater length of travel than the stop 17. The ratio of these distance is, of course, adjustable by moving the plate 32 vertically as previously discussed, to change the ratio of the length from the pivot point 23 to each of the rollers 21 and 28.

From the foregoing, it will be apparent that the stop member 17 covers only a relatively small length of path of travel while the vertical support 39 to the contrary is moved over a much greater path of travel in the same length of time. The stop 7, as the piston rod 14 is drawn away, acts as a stripper for the piece cut off in the cutting station. The support plate 39 rapidly moves away to the dotted line position so that the cut piece can drop freely downwardly.

If it is desired to operate without the vertical support 39, then the roller 28 is easily removed from the slot 27, and the shaft 36 is slid to the right so that the support plate is out of the way. The stop and the other mechanism will continue operation with this simple adjustment which can be made at any time in a few seconds.

Thus, it will be seen that I have provided an improved cutter mechanism which achieves the objectives and advantages above set forth and which provides for improved cutting and attains a mechanism that can operate at a higher operating speed, and yet which is quickly and readily adjustable to accommodate for different lengths of pieces to be cut.

I claim as my invention:

1. A cutter mechanism for cutting the ends off bar stock or the like comprising in combination:
    a cutting station with a cutter operable to cut end pieces from a length of bar stock advanced incrementally to move the piece to be cut into the cutting station;
    a vertical support movable laterally between a support position beneath said station and a release position laterally away from the station with said support vertically clear of the station and said release position;
    a stop member movable laterally between a stop position adjacent the cutting station where said piece abuts the stop member and a release position laterally away from said piece;
    said member and support having substantially parallel movement;
    and a common drive means connected to said support and to said stop member for simultaneous movement thereof.

2. A cutter mechanism for cutting the ends off bar stock or the like constructed in accordance with claim 1:
    wherein said drive means includes a pivotal swinging arm with said stop member connected at one location on the arm and said vertical support connected at a second location spaced further from the pivot point of the arm.

3. A cutter mechanism for cutting the ends off bar stock or the like constructed in accordance with claim 1:
  wherein said vertical support is carried on a rod slidably supported in a bearing with one end of the rod supporting the vertical support and the other end of the rod connected to said drive means.

4. A cutter mechanism for cutting the ends off bar stock or the like constructed in accordance with claim 3:
  wherein said vertical support is vertically adjustable on said rod.

5. A cutter mechanism for cutting the ends off bar stock or the like constructed in accordance with claim 1:
  wherein said vertical support has an inclined portion on its upper surface inclined downwardly toward said cutting station.

6. A cutter mechanism for cutting the ends off bar stock or the like constructed in accordance with claim 1:
  wherein said drive means includes a piston and cylinder assembly connected to the stop member with the vertical support driven thereby through an adjustable stroke drive.

7. A cutter mechanism for cutting the ends off bar stock or the like constructed in accordance with claim 6:
  wherein said adjustable stroke drive includes a pivotal arm connected at an intermediate location to the cylinder piston assembly and at an end location to the vertical support.

8. A cutter mechanism for cutting the ends off bar stock or the like constructed in accordance with claim 1:
  including a frame with a pivotal arm supported on the frame and forming part of said drive means with the stop member connected intermediately to the pivotal arm and the vertical suppport connected at the end of said pivotal arm.

9. A cutter mechanism for cutting the ends off bar stock or the like constructed in accordance with claim 8:
  wherein said pivotal arm has a slot at the end with a follower in said slot and connected to said vertical support for operating the support with pivotal movement of the arm.

10. A cutter mechanism for cutting the ends off bar stock or the like constructed in accordance with claim 9:
  wherein said follower is adjustable relative to the vertical support for changing the movement distance of the support relative to the stop member with movement of the pivotal arm.

11. A cutter mechanism for cutting the ends off bar stock or the like constructed in accordance with claim 10:
  wherein said follower is in the form of a roller secured to a plate which is adjustably connected to a reciprocal shaft carrying said vertical support.

12. A cutter mechanism for cutting the ends off bar stock or the like constructed in accordance with claim 1:
  including a frame carrying said support, stop member and drive means, and means adjustably mounting the cutters on the frame for changing the relative lateral location of the cutters relative to the frame.

13. A cutter mechanism for cutting the ends off bar stock of the like constructed in accordance with claim 1:
  wherein said drive means includes a first reciprocal shaft carrying said stop member, a piston mounted on the shaft, a cylinder surrounding the piston with means for directing pressurized fluid to the cylinder for reciprocating the shaft, a rocker arm at the distal end of the shaft pivotally supported thereabove on a frame, a follower roller on the shaft engaged in a slot on the rocker arm intermediate its ends,
  the distal end of the rocker arm being bifurcated;
  a second reciprocating shaft supporting the vertical support, a plate on the distal end of the second shaft, a follower roller on the plate engaged in the bifurcated end of the rocker arm and adjustable for adjusting the stroke of the second shaft;
  and means vertically adjustably supporting the vertical support on the second shaft.

* * * * *